(12) United States Patent
Smith et al.

(10) Patent No.: US 11,669,333 B2
(45) Date of Patent: Jun. 6, 2023

(54) METHOD, APPARATUS, AND SYSTEM FOR REDUCING LIVE READINESS CALCULATIONS IN RESERVATION STATIONS

(71) Applicant: QUALCOMM Incorporated, San Diego, CA (US)

(72) Inventors: Rodney Wayne Smith, Raleigh, NC (US); Raghavan Madhavan, Cary, NC (US); Luke Yen, Raleigh, NC (US); Shivam Priyadarshi, Morrisville, NC (US); Yusuf Cagatay Tekmen, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 293 days.

(21) Appl. No.: 15/963,126

(22) Filed: Apr. 26, 2018

(65) Prior Publication Data

US 2019/0332385 A1    Oct. 31, 2019

(51) Int. Cl.
  *G06F 9/30* (2018.01)
  *G06F 9/38* (2018.01)
(52) U.S. Cl.
  CPC .......... *G06F 9/3851* (2013.01); *G06F 9/3802* (2013.01)
(58) Field of Classification Search
  CPC ..... G06F 9/3802; G06F 9/3851; G06F 9/3836
  See application file for complete search history.

(56) References Cited

U.S. PATENT DOCUMENTS

| | | | |
|---|---|---|---|
| 6,609,190 B1 | 8/2003 | Kahle et al. | |
| 7,721,291 B2 | 5/2010 | McKenney | |
| 8,732,711 B2 | 5/2014 | Dally | |
| 8,732,713 B2 | 5/2014 | Coon | |
| 9,645,819 B2 | 5/2017 | Iyer et al. | |
| 2004/0064679 A1* | 4/2004 | Black | G06F 9/3836 712/214 |
| 2015/0106595 A1* | 4/2015 | Khot | G06F 9/3836 712/215 |
| 2015/0113538 A1 | 4/2015 | Giroux | |
| 2016/0350159 A1 | 12/2016 | Warrier | |
| 2017/0102949 A1 | 4/2017 | Khot et al. | |

OTHER PUBLICATIONS

International Search Report and Written Opinion—PCT/US2019/028517—ISA/EPO—dated Aug. 2, 2019.

\* cited by examiner

*Primary Examiner* — Corey S Faherty
(74) *Attorney, Agent, or Firm* — Edward J. Meisarosh

(57) ABSTRACT

In certain aspects of the disclosure, an apparatus comprises a first scheduling pool associated with a first minimum scheduling latency and a second scheduling pool associated with a second minimum scheduling latency, the second minimum scheduling latency greater than the first minimum scheduling latency. A common instruction picker is coupled to both the first scheduling pool and the second scheduling pool. The common instruction picker may be configured to select a first instruction from the first scheduling pool and a second instruction from the second scheduling pool, and then choose either the first instruction or second instruction for dispatch according to a picking policy.

15 Claims, 5 Drawing Sheets

METHOD, APPARATUS, AND SYSTEM FOR REDUCING LIVE READINESS CALCULATIONS IN RESERVATION STATIONS

BACKGROUND

Field

Aspects of the present disclosure relate generally to reservation stations in processors, and more specifically to reducing the number of live readiness calculations made in reservation stations.

Background

Instruction scheduling in high-performance CPUs benefits from a large "window" of instructions (meaning the set of instructions that the processor may select for dispatch into an execution pipeline). The "window" of instructions that may be selected for dispatch may be physically realized as and stored in a structure conventionally called a reservation station. Having a physically large reservation station from which to choose instructions for dispatch allows for efficient out-of-order operation (i.e., the larger the pool, the easier it is generally to exploit instruction-level parallelism, also known as ILP, and memory-level parallelism, also known as MLP, because it is easier to find instructions awaiting dispatch that do not have any dependencies, and thus will not cause stalls of the execution pipeline). In addition, it is advantageous to be able to support a single-cycle "wakeup" of instructions in the queue. Supporting back-to-back single-cycle-latency instructions that have dependencies upon each other increases opportunities to exploit ILP and MLP, because such instructions may now be "woken up" and issued to an execution pipeline in consecutive cycles. Such a single-cycle "wakeup" of instructions is referred to as a "live readiness calculation," and performing live readiness calculations can incur significant area and performance overhead.

However, increasing the size of the reservation station also compromises performance because the high capacitive and drive loads on the "wakeup" signals that need to be broadcast quickly increase, and affect the critical path through the reservation station. In turn, this often directly impacts maximum clock frequency and overall processor performance. Thus, it is not practical to simply increase the size of the reservation station in order to increase performance and ILP. Other approaches have attempted to resolve this by having individual reservation stations for separate functional units. However, this makes achieving sufficient ILP difficult if there is a significant imbalance in the number of the various types of instructions in the instruction queue.

It would thus be desirable to design a system that allows the performance advantages of a large reservation station, but without incurring the disadvantages of increased area and reduced maximum clock frequency associated with providing single-cycle "wakeup" of all the instructions in the reservation station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, an apparatus comprises a first scheduling pool, a second scheduling pool, and a common instruction picker. The first scheduling pool has a first minimum scheduling latency, and the second scheduling pool has a second minimum scheduling latency greater than the first minimum scheduling latency. The common instruction picker is coupled to both the first scheduling pool and the second scheduling pool.

In another aspect, an apparatus comprises first means for storing instructions to be scheduled, second means for storing instructions to be scheduled, and means for picking instructions. The first means for storing instructions to be scheduled is associated with a first minimum scheduling latency, and the second means for storing instructions to be scheduled is associated with a second minimum scheduling latency which is greater than the first minimum scheduling latency. The means for picking instructions is common to both the first means for storing instructions to be scheduled and the second means for storing instructions to be scheduled.

In another aspect, a method includes placing an instruction into one of a first scheduling pool and a second scheduling pool. The first scheduling pool has a first minimum scheduling latency and the second scheduling pool has a second minimum scheduling latency greater than the first minimum scheduling latency. The method further includes picking the instruction from either the first scheduling pool or the second scheduling pool by a common instruction picker.

In another aspect, a method includes receiving wakeup information regarding an instruction in a current scheduling pool. The method further includes determining that the instruction should be assigned to an updated scheduling pool based on the wakeup information, and transferring the instruction from the current scheduling pool to the updated scheduling pool.

One advantage of one or more disclosed aspects is allowing for instructions that are known or suspected to benefit from fast wakeup to be stored in a first scheduling pool, while those instructions that are known or suspected not to benefit from fast wakeup are stored in a second scheduling pool, thus allowing the first scheduling pool dedicated to fast wakeup instructions to be made smaller relative to the size of a previously-known single scheduling pool. This conserves silicon area and improves critical path performance through the first scheduling pool. Further, in some aspects, the second scheduling pool may store a relatively larger number of entries than previously-known single scheduling pools because it does not need to be capable of implementing fast wakeups.

DETAILED DESCRIPTION

Aspects of the inventive teachings herein are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of aspects of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
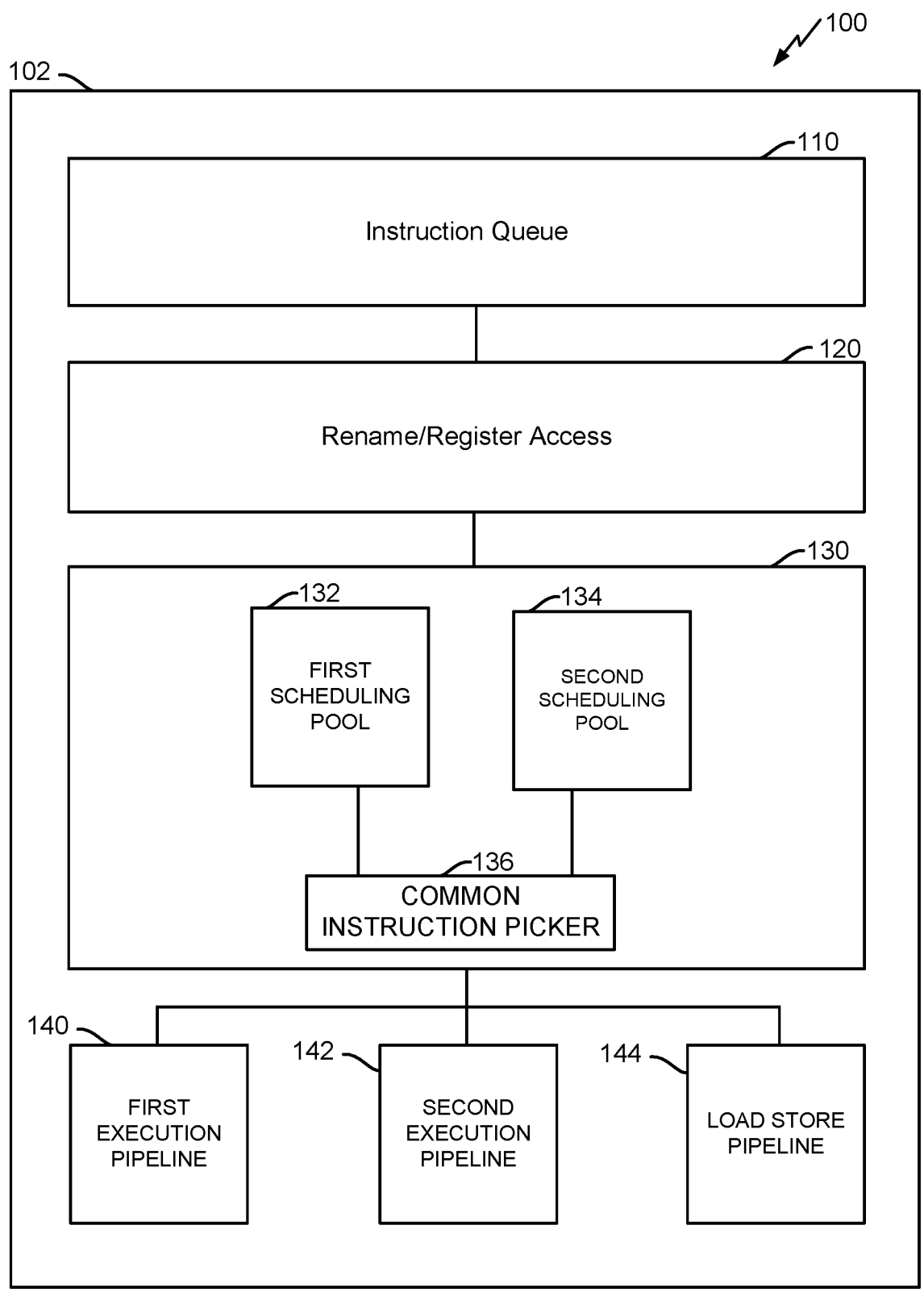
FIG. 1 shows a block diagram of a computing device including an apparatus for reducing live readiness calculations according to certain aspects of the present disclosure.

In this regard, in one aspect, FIG. 1 shows a computing device 100 including a processor 102 configured to reduce live readiness calculations as described herein. The processor 102 includes an instruction queue 110, a rename/register access stage 120 coupled to the instruction queue 110, and an instruction reservation station block 130 coupled to the rename/register access stage 120. The instruction reservation station block 130 further includes a first scheduling pool 132 and a second scheduling pool 134. The instruction reservation station block 130 further couples to a first execution pipeline 140, a second execution pipeline 142, and a load/store pipeline 144.

An instruction to be executed by the processor 102 first enters the instruction queue 110. When the instruction moves from the instruction queue 110, through the rename/register access stage 120, and enters the instruction reservation station block 130, a determination is made regarding a desired minimum wakeup latency for the instruction. If it is determined that the instruction may benefit from a fast minimum wakeup latency, the instruction is placed in a first scheduling pool 132 that is configured to provide a first minimum wakeup latency in accordance with aspects of the present disclosure. If it is determined that the instruction is unlikely to benefit from the fast minimum wakeup latency, the instruction is placed in a second scheduling pool 134 that is configured to provide a second minimum wakeup latency, the second minimum wakeup latency being longer than the first minimum wakeup latency associated with the first scheduling pool 132. In some aspects, the first scheduling pool 132 may provide single-clock-cycle wakeup latency for instructions stored within the first scheduling pool 132.

Both the first scheduling pool 132 and the second scheduling pool 134 are coupled to a common instruction picker 136. The common instruction picker 136 is configured to select instruction(s) from both the first scheduling pool 132 and the second scheduling pool 134. The selected instruction(s) are dispatched to one of the first execution pipeline 140, the second execution pipeline 142, or the load/store pipeline 144. The ability to select instructions from both the first scheduling pool 132 and the second scheduling pool 134 allows the processor 102 to more efficiently use its available computing resources, since it allows for the pool of total instructions that may be picked for execution to be made relatively larger compared to a system in which all instructions must be available for low minimum latency wakeup (e.g., single-cycle wakeup), while retaining most of the performance benefits of an implementation where all instructions must be available for low minimum latency wakeup.

Figure 2:
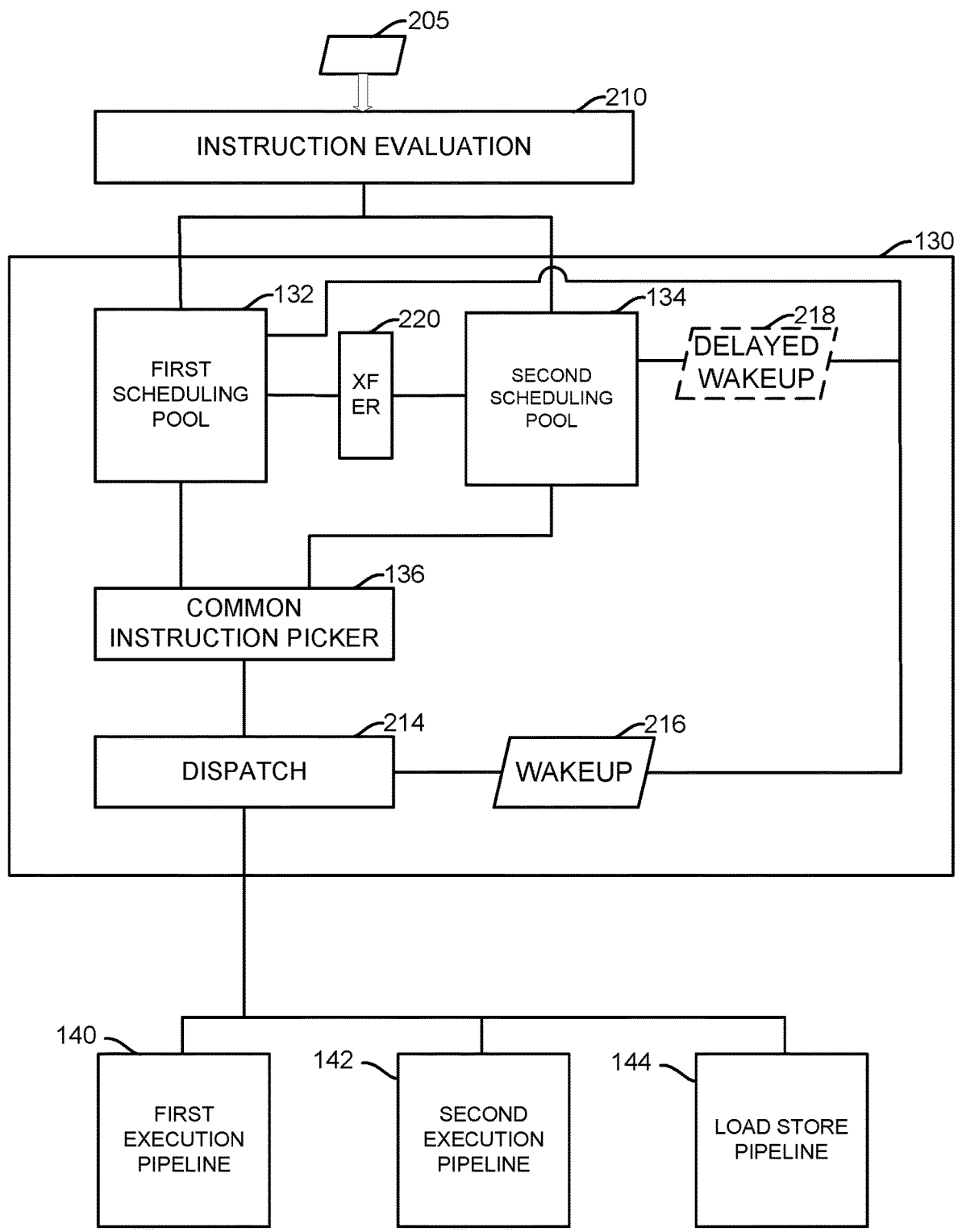
FIG. 2 shows a detailed diagram of the apparatus for reducing live readiness calculations according to certain aspects of the present disclosure.

In this regard, FIG. 2 provides a detailed view of the instruction reservation station block 130 in order to illustrate some aspects of the present disclosure. After an instruction 205 passes through the rename/register access stage 120, it enters the instruction reservation station block 130 and is evaluated in instruction evaluation block 210. Instruction evaluation block 210 performs an initial determination of whether the instruction 205 will benefit from a fast minimum wakeup latency, and based on this determination, places the instruction 205 into either the first scheduling pool 132 (also referred to as the "fast pool") configured to provide a first minimum wakeup latency or the second scheduling pool 134 (also referred to as the "slow pool") configured to provide a second minimum wakeup latency that is longer than the first minimum wakeup latency.

The initial determination of whether to place the instruction 205 into either the first scheduling pool 132 or the second scheduling pool 134 (i.e., whether the instruction 205 may benefit from a fast minimum wakeup latency) may be based on one or more factors related to the instruction 205 and/or one or more factors related to the status of each scheduling pool. With respect to instruction 205, an initial preference for the first scheduling pool 132 or the second scheduling pool 134 may be determined based on characteristics of the instruction 205, and how the instruction 205 behaves both as a producer instruction and as a consumer instruction. For example, whether the instruction has a specific and known latency associated with it, and whether the instruction will be assigned to a specific execution pipeline are among the factors that may be considered from the perspective of instruction 205 being a producer instruction. Whether the instruction 205 depends on a load/store instruction or an arithmetic-type instruction, the number of total register operand dependencies of the instruction 205, the type of operand dependencies of instruction 205, and whether instructions upon which instruction 205 depends have hit or missed in system caches are among the factors that may be considered from the perspective of instruction 205 being a consumer instruction. Based on a consideration of these (and other similar factors which may be evident to those having skill in the art), the instruction 205 is initially assigned a preference for either the first scheduling pool 132 or the second scheduling pool 134. For example, in one aspect, if instruction 205 has either at least one producer that has single-cycle wakeup, or has all producers that have single-wakeup, instruction 205 may have a preference for the fast pool. Alternatively, if instruction 205 has all its operands ready such that it will not need fast wakeup, if all of the producers for instruction 205 are constants, or where even one producer for instruction 205 is a non-single-cycle wakeup instruction, instruction 205 may have a preference for the slow pool. Those having skill in the art will recognize that these are merely illustrative examples, and other policies and instruction characteristics may be used to determine a preference of instruction 205 for either the fast pool or the slow pool.

Once the preference of the instruction 205 has been determined, the status of each scheduling pool is evaluated to determine the initial placement for instruction 205. If the preferred pool is available (i.e., there is space for instruction 205 in the preferred pool), the instruction 205 is initially placed in the preferred pool. If the preferred pool is not available, the instruction 205 is placed in another available pool.

The common instruction picker 136 examines instructions (such as instruction 205) in both the first scheduling pool 132 and the second scheduling pool 134, and picks one or more instructions to be provided to dispatch block 214 based on dependency (and other) information associated with each instruction in the first scheduling pool 132 and the second scheduling pool 134. In one aspect, the common instruction picker 136 may be a monolithic picker configured to evaluate instructions in both the first scheduling pool 132 and the second scheduling pool 134 and directly select an instruction based on characteristics of the instructions in each pool and/or a picking policy. In another aspect, the common instruction picker 136 may further comprise a first picker configured to select an instruction from the first scheduling pool 132, a second picker configured to select an instruction from the second scheduling pool 134, and a selection circuit to choose either the instruction from the first scheduling pool 132 or the instruction from the second scheduling pool 134 based on characteristics of the instruction and/or a picking policy. Example picking policies for instructions include choosing from the faster scheduling pool first, choosing from the slower scheduling pool first, round robin selection from among the scheduling pools, choosing from the pool with the oldest ready instruction, choosing from the pool having the most older instructions. A further example picking policy would include dynamically changing the selection policy between the pools based on number of instructions selected (selection count), the number of cycles since the last selection from the slow pool, and/or comparison of the age of the ready instruction from the slow pool to the ready instruction from the past pool. The dispatch block 214 evaluates the picked instruction(s) and determines whether to send the picked instruction(s) to the first execution pipeline 140, the second execution pipeline 142, or the load/store pipeline 144.

The dispatch block 214 further provides wakeup information 216 back to both the first scheduling pool 132 and the second scheduling pool 134 (and, in some aspects, may provide specific delayed wakeup information 218 as a subset of wakeup information 216 to the second scheduling pool 134), and in some aspects to an instruction transfer block 220. The wakeup information 216 and the delayed wakeup information 218 may be used to update dependency (and other) information related to instructions stored in each of the first scheduling pool 132 and the second scheduling pool 134. Further, the wakeup information 216 may also be provided to and used by the instruction transfer block 220 to determine whether to transfer an instruction (such as instruction 205) between the first scheduling pool 132 and the second scheduling pool 134, as described with respect to FIG. 4. The wakeup information 216 may comprise instruction dispatch/completion status information, hit/miss information, pipeline assignment information, or other types of instruction metadata for source instructions related to consumer instructions in either the first scheduling pool 132 or the second scheduling pool 134.

Figure 3:
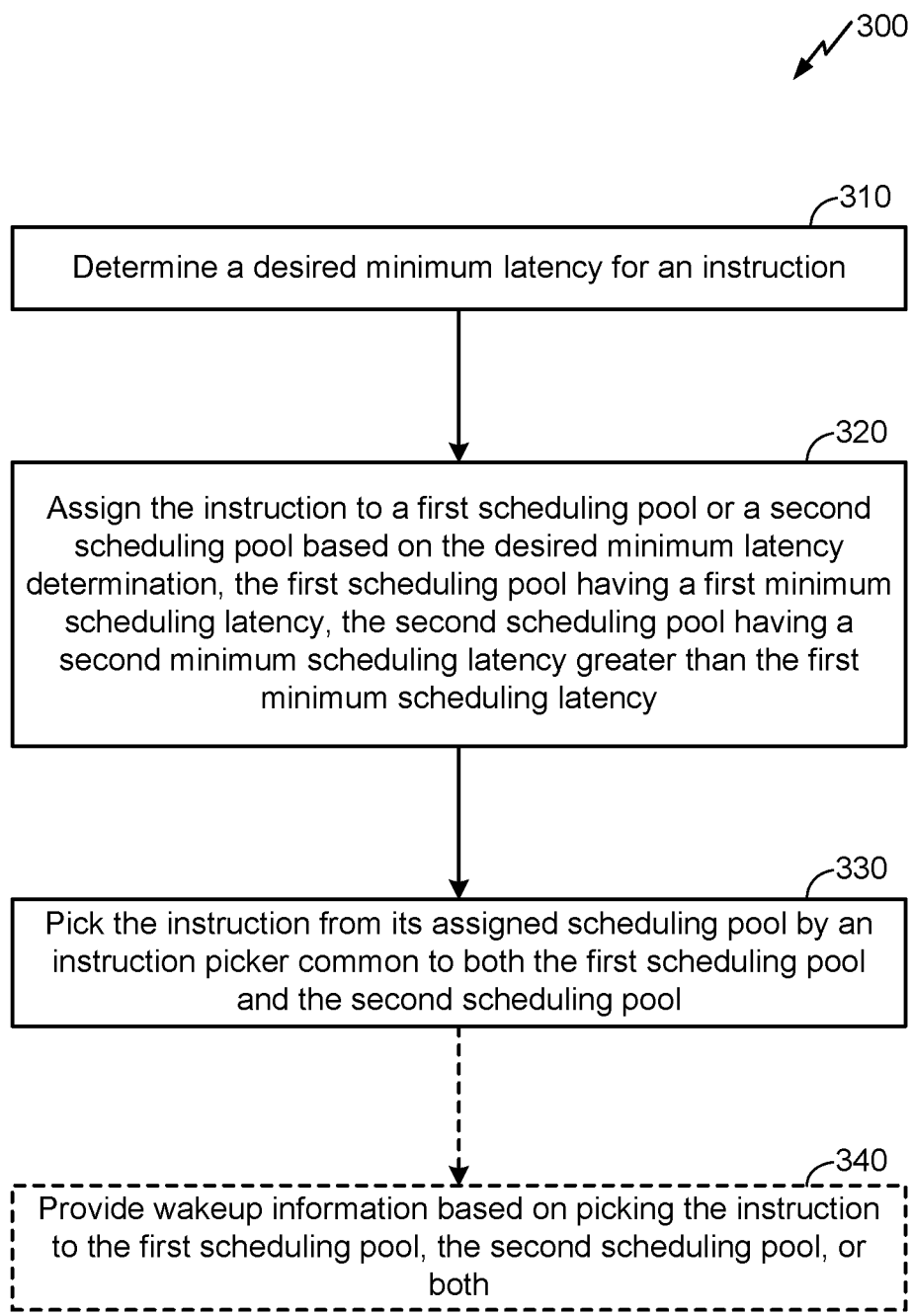
FIG. 3 shows a block diagram of a method for reducing live readiness calculations according to certain aspects of the present disclosure.

FIG. 3 shows a block diagram of a method for reducing live readiness calculations according to certain aspects of the present disclosure. The method 300 begins in block 310, where a desired minimum latency for an instruction is determined, e.g., instruction 205 is evaluated in instruction evaluation block 210 as described with respect to FIG. 2. Further, the desired minimum wakeup latency for the instruction may be based on the various factors (and other related factors) discussed with respect to instruction 205 of FIG. 2.

The method 300 continues in block 320, where the instruction is assigned to a first scheduling pool or a second scheduling pool based on the desired minimum latency determination. For example, the instruction 205 is assigned to either the first scheduling pool 132 having the first desired minimum latency or the second scheduling pool 134 having the second desired minimum latency which is longer than the first desired minimum latency.

The method continues in block 330, where the instruction is picked from its assigned scheduling pool by an instruction picker that is common to both the first scheduling pool and the second scheduling pool. For example, the common instruction picker 136 selects instruction 205 from either the first scheduling pool 132 or the second scheduling pool 134 (depending on which pool the instruction 205 currently is assigned to, either initially or as a result of being transferred from one pool to another as described with respect to FIG. 4).

In some aspects, the method 300 may include block 340. In block 340, wakeup information based on the picking of the instruction 205 is provided to the first scheduling pool, the second scheduling pool, or both. The wakeup information may be used to update dependency information associated with one or more instructions in the first scheduling pool 132 or the second scheduling pool 134. The wakeup information may further be used by the instruction transfer block 220 in order to determine whether one or more instructions should be moved from the first scheduling pool 132 to the second scheduling pool 134, or from the second scheduling pool 134 to the first scheduling pool 132, as further described with respect to FIG. 4.

Figure 4:
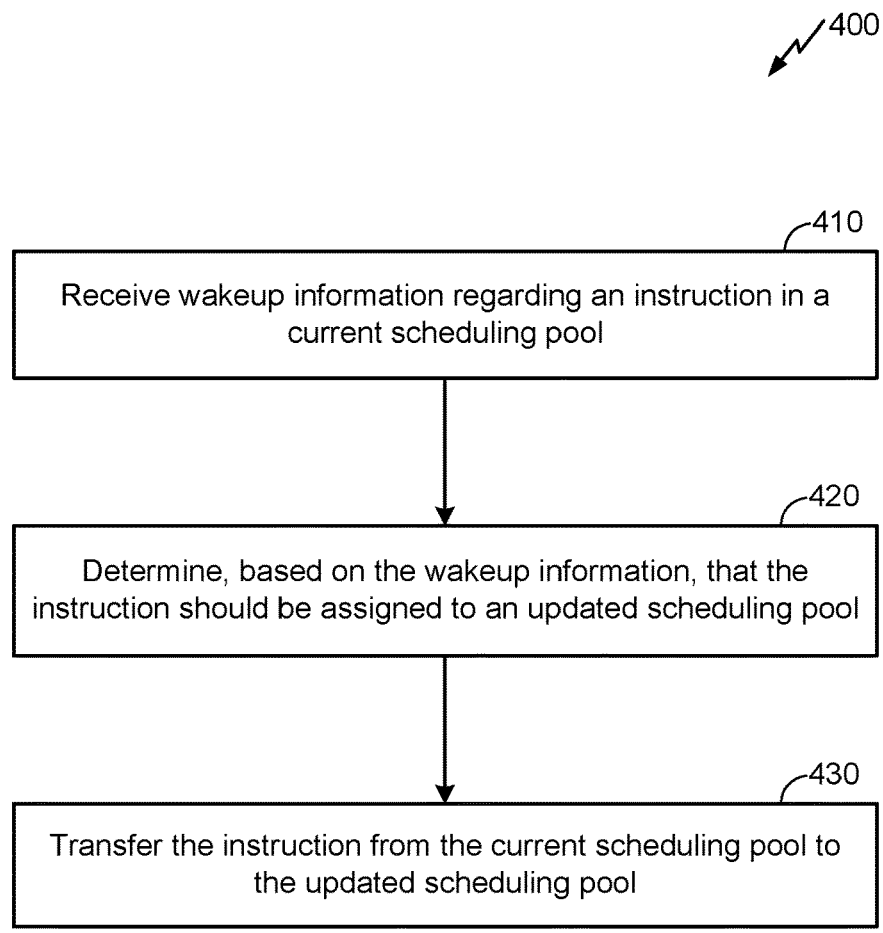
FIG. 4 shows a block diagram of another method for reducing live readiness calculations according to certain aspects of the present disclosure.

FIG. 4 shows a block diagram of another method for reducing live readiness calculations according to certain aspects of the present disclosure. The method begins in block 410, where information regarding an instruction in a current scheduling pool is received. For example, the second scheduling pool 134 and/or the instruction transfer block 220 may receive information regarding dependencies for instruction 205, which is currently assigned to the second scheduling pool 134.

The method continues in block 420, where it is determined, based on the information, that the instruction should be assigned to an updated scheduling pool. For example, the second scheduling pool 134 and/or the instruction transfer block 220 examines the information regarding dependencies for instruction 205, and determines that, based on the information regarding dependencies for instruction 205, that instruction 205 could now benefit from the first desired minimum wakeup latency (e.g., because some previous dependencies have now resolved, and the instruction 205 is no longer waiting on any data/condition code updates).

The method continues in block 430 by transferring the instruction from the current scheduling pool to the updated scheduling pool. For example, based on the determination in block 420, the instruction transfer block 220 transfers the instruction 205 from the second scheduling pool 134 to the first scheduling pool 132.

Those having skill in the art will recognize that particular designs may implement different combinations of the previously-described methods 300 and 400. For example, one implementation may initially assign instructions to scheduling pools as described with respect to method 300, but may not provide the ability to transfer instructions between scheduling pools as described with respect to method 400. Another implementation may initially assign instructions to the first scheduling pool 132 until the first scheduling pool 132 is full, and then assign instructions to the second scheduling pool 134, instead of performing the initial assignment of instructions as described with respect to method 300, but may transfer instructions between the first scheduling pool 132 and the second scheduling pool 134 as described with respect to method 400. Still another implementation may initially assign instructions to scheduling pools as described with respect to method 300 and may transfer instructions as described with respect to method 400. Those having skill in the art will realize that all these implementations (and others) are within the scope of the present disclosure, and are design choices to be made according to the desired capabilities of a particular implementation.

Figure 5:
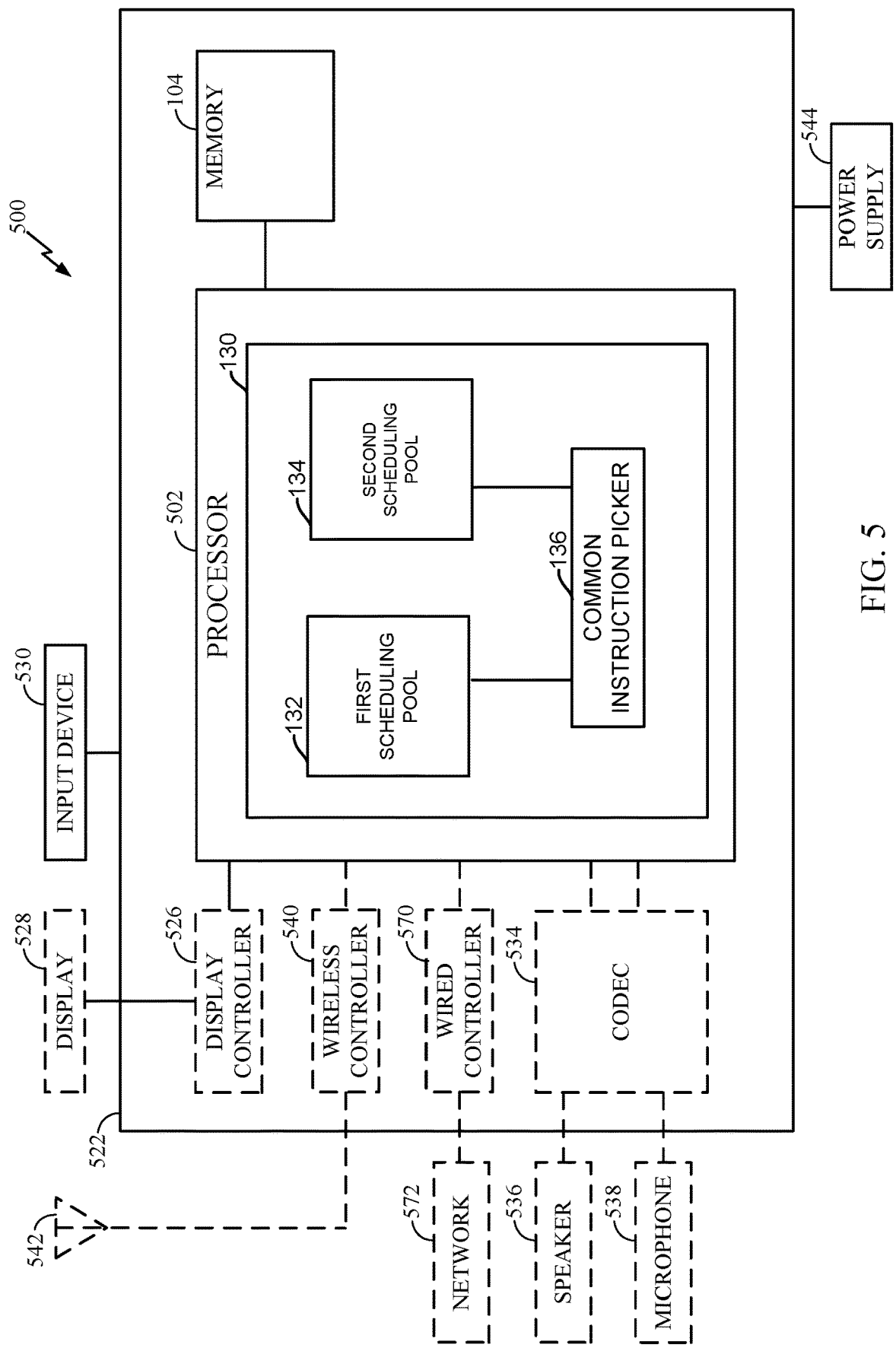
FIG. 5 shows a system-level diagram incorporating a computing device including an apparatus for reducing live readiness calculations according to certain aspects of the present disclosure.

An example apparatus in which aspects of this disclosure may be utilized will now be described in relation to FIG. 5. FIG. 5 shows a diagram of a computing device 500 incorporating a reservation station providing for reduced live readiness calculations as described with respect to FIG. 1 and FIG. 2, and which may be operable in accordance with the method described in FIG. 3 and FIG. 4. In that regard, the system 500 includes a processor 502 which may correspond to the processor 102, and which may incorporate the instruction reservation station block 130, first scheduling pool 132, second scheduling pool 134, and common instruction picker 136 (and other components of the processor 102 not specifically illustrated) as described with regard to FIGS. 1 and 2, and a memory 104 coupled to the processor 102. The memory 104 may further store non-transitory computer-readable instructions that, when executed by the processor 102, may perform the method 300 of FIG. 3, the method 400 of FIG. 4, or both.

FIG. 5 also shows optional blocks in dashed lines, such as coder/decoder (CODEC) 534 (e.g., an audio and/or voice CODEC) coupled to processor 502, with speaker 536 and microphone 538 coupled to CODEC 534; and wireless antenna 542 coupled to wireless controller 540 which is coupled to processor 502. Further, the system 502 also shows display controller 526 that is coupled to processor 502 and to display 528, and wired network controller 570 coupled to processor 502 and to a network 572. Where one or more of these optional blocks are present, in a particular aspect, processor 502, display controller 526, memory 104, and wireless controller 540 may be included in a system-in-package or system-on-chip device 522.

In one aspect, input device 530 and power supply 544 are coupled to the system-on-chip device 522. Moreover, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 generally depicts a computing device, processor 502 and memory 104, may also be integrated into a mobile phone, a communications device, a computer, a server, a laptop, a tablet, a personal digital assistant, a music player, a video player, an entertainment unit, and a set top box, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for reducing live readiness calculations in reservation stations, as described in reference to FIG. 3, FIG. 4, or both. Accordingly, the disclosure is not limited to illustrated examples and any means for performing the functionality described herein are included in aspects of the disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus, comprising:
a first scheduling pool associated with a first minimum scheduling latency;
a second scheduling pool associated with a second minimum scheduling latency, the second minimum scheduling latency greater than the first minimum scheduling latency;
a common instruction picker coupled to both the first scheduling pool and the second scheduling pool; and
a dispatch block coupled to the common instruction picker and configured to:
receive an instruction from the common instruction picker and provide the instruction to an execution pipeline; and
provide wakeup information to the first scheduling pool and the second scheduling pool, wherein the wakeup information comprises dispatch/completion status information.

2. The apparatus of claim 1, wherein the common instruction picker is configured to select a first instruction from the first scheduling pool and a second instruction from the second scheduling pool, and to apply a picking policy to determine whether to provide the first instruction or the second instruction for dispatch.

3. The apparatus of claim 1, wherein the first minimum scheduling latency is one clock cycle.

4. The apparatus of claim 1 further comprising an instruction evaluation block, the instruction evaluation block configured to:
receive an instruction;
determine whether the instruction can benefit from the first minimum scheduling latency;
place the instruction in the first scheduling pool if it is determined that the instruction can benefit from the first minimum scheduling latency and the first scheduling pool is available; and
place the instruction in the second scheduling pool if it is determined that the instruction cannot benefit from the first minimum scheduling latency and the second scheduling pool is available.

5. The apparatus of claim 4, wherein the instruction evaluation block determines whether the instruction can benefit from the first minimum scheduling latency based on at least one of: a specific and known latency of the instruction; a specific pipeline to which the instruction will be dispatched; whether the instruction is an arithmetic instruction or a load/store instruction; a number of total register dependencies of the instruction; and whether other instructions upon which the instruction depends have hit or missed in a cache or memory.

6. The apparatus of claim 1, further comprising an instruction transfer block coupled to the first scheduling pool and the second scheduling pool, and configured to transfer instructions between the first scheduling pool and the second scheduling pool based on the wakeup information received from the dispatch block.

7. The apparatus of claim 1, wherein the wakeup information further comprises at least one of hit/miss information and pipeline assignment information.

8. The apparatus of claim 1, integrated into a computing device.

9. The apparatus of claim 8, the computing device further integrated into a device selected from the group consisting of a mobile phone, a communications device, a computer, a server, a laptop, a tablet, a personal digital assistant, a music player, a video player, an entertainment unit, and a set top box.

10. An apparatus, comprising:
first means for storing instructions to be scheduled associated with a first minimum scheduling latency;
second means for storing instructions to be scheduled associated with a second minimum scheduling latency, the second minimum scheduling latency greater than the first minimum scheduling latency;
means for picking instructions common to both the first means for storing instructions to be scheduled and the second means for storing instructions to be scheduled; and
means for dispatching, coupled to the common instruction picker, comprising:
means for receiving an instruction from the means for picking instructions and providing the instruction to an execution pipeline; and
means for providing wakeup information to the first and second means for storing instructions, wherein the wakeup information comprises dispatch/completion status information.

11. A method, comprising:
placing an instruction into one of a first scheduling pool and a second scheduling pool, the first scheduling pool having a first minimum scheduling latency, the second scheduling pool having a second minimum scheduling latency greater than the first minimum scheduling latency;
picking the instruction from either the first scheduling pool or the second scheduling pool by a common instruction picker; and
providing wakeup information to the first scheduling pool and the second scheduling pool based on the picking of the instruction, wherein the wakeup information comprises dispatch/completion status information.

12. The method of claim 11, wherein the instruction is placed into one of the first scheduling pool and the second scheduling pool is by determining whether the instruction can benefit from the first minimum scheduling latency.

13. The method of claim 12, wherein the determination of whether the instruction can benefit from the first minimum scheduling latency is based on at least one of: a specific and known latency of the instruction; a specific pipeline to which the instruction will be dispatched; whether the instruction is an arithmetic instruction or a load/store instruction; a number of total register dependencies of the instruction; and whether other instructions upon which the instruction depends have hit or missed in a cache or memory.

14. The method of claim 11, wherein the wakeup information further comprises at least one of hit/miss information and pipeline assignment information.

15. The method of claim 11, comprising updating dependency information for at least one other instruction in either the first scheduling pool or the second scheduling pool based on the wakeup information.

\* \* \* \* \*